(12) United States Patent
Funo et al.

(10) Patent No.: US 10,056,650 B2
(45) Date of Patent: Aug. 21, 2018

(54) LEAD-ACID BATTERY

(71) Applicant: GS Yuasa International Ltd., Kyoto-shi, Kyoto (JP)

(72) Inventors: Shinya Funo, Kyoto (JP); Kazuma Saito, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 204 days.

(21) Appl. No.: 15/242,817

(22) Filed: Aug. 22, 2016

(65) Prior Publication Data

US 2017/0062875 A1 Mar. 2, 2017

(30) Foreign Application Priority Data

Sep. 1, 2015 (JP) .................. 2015-171952

(51) Int. Cl.
| | |
|---|---|
| *H01M 10/12* | (2006.01) |
| *H01M 2/12* | (2006.01) |
| *H01M 2/36* | (2006.01) |

(52) U.S. Cl.
CPC ......... *H01M 10/12* (2013.01); *H01M 2/1252* (2013.01); *H01M 2/365* (2013.01); *H01M 2/367* (2013.01); *Y02E 60/126* (2013.01)

(58) Field of Classification Search
CPC .... H01M 10/12; H01M 2/367; H01M 2/1252; H01M 2/365; Y02E 60/126
See application file for complete search history.

(56) References Cited

U.S. PATENT DOCUMENTS

| | | |
|---|---|---|
| 4,613,550 A | 9/1986 | Kump |
| 4,891,270 A | 1/1990 | Kump |

| | | | |
|---|---|---|---|
| 2011/0039153 A1* | 2/2011 | Nakayama | ............ H01M 2/043 429/181 |
| 2011/0135979 A1* | 6/2011 | Nakayama | .......... H01M 2/1217 429/87 |
| 2016/0254510 A1* | 9/2016 | Fujimoto | ............ H01M 2/1252 429/82 |
| 2016/0293918 A1* | 10/2016 | Fujimoto | ............ H01M 2/1252 |

FOREIGN PATENT DOCUMENTS

| | | |
|---|---|---|
| JP | 62052854 A2 | 3/1987 |
| JP | 7036359 A2 | 2/1995 |
| JP | 11016559 | 7/1995 |
| JP | 2001266846 A2 | 9/2001 |
| JP | 2002540567 | 11/2002 |
| JP | 2006196341 A2 | 7/2006 |
| JP | 2010272264 A2 | 12/2010 |
| WO | 200057502 A1 | 9/2000 |

\* cited by examiner

*Primary Examiner* — Stewart A Fraser
(74) *Attorney, Agent, or Firm* — Rankin, Hill & Clark LLP

(57) ABSTRACT

A lead-acid battery disclosed in the present specification includes: a container storing an element formed of a plurality of electrodes and an electrolyte solution; and a lid member fixed to an upper portion of the container. The lid member includes: a middle lid having a lid plate configured to seal an opening of the container; a cylindrical exhaust sleeve formed in a plateau portion formed on the lid plate in a penetrating manner and configured to discharge a gas generated in the container therethrough; and a recessed portion disposed adjacently to the exhaust sleeve and formed on a lower surface of the plateau portion in an upwardly recessed manner. The exhaust sleeve has a communication hole which communicates with the inside of the recessed portion and the inside of the exhaust sleeve.

9 Claims, 10 Drawing Sheets

LEAD-ACID BATTERY

CROSS-REFERENCE TO RELATED APPLICATIONS

This application is based on Japanese Patent Application No. 2015-171952 filed on Sep. 1, 2015, the entire contents of which is hereby incorporated by reference.

FIELD

A technique disclosed in the present specification relates to a technique for suppressing a leakage of an electrolyte solution which may be caused by rising of a solution level of the electrolyte solution in a lead-acid battery.

BACKGROUND

As a lead-acid battery used in a vehicle or the like, there has been known a lead-acid battery disclosed in JP 2010-272264 A, for example. The lead-acid battery is configured such that, to suppress rising of an internal pressure of the battery, a gas generated in a container is discharged upward through an exhaust sleeve.

When a solution level of an electrolyte solution in the container rises and eventually reaches to a position of the exhaust sleeve, in the container, a pressure difference is generated between the inside of the exhaust sleeve communicating with an exhaust space and the outside of the exhaust sleeve. When the pressure difference is generated between the inside and the outside of the exhaust sleeve, a solution level of the electrolyte solution in the exhaust sleeve rises as the solution level in the container rises and hence, an electrolyte solution is liable to be leaked from an outlet of the exhaust sleeve. Accordingly, there has been studied a lead-acid battery having the configuration where a slit-like communication hole extending downward from a lower surface of a middle lid is formed in a wall portion which forms an exhaust sleeve. According to this configuration, a gas and an electrolyte solution are allowed to flow between the inside and the outside of the exhaust sleeve through the communication hole thus suppressing rising of a solution level of an electrolyte solution in the exhaust sleeve.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to the above-mentioned configuration, when a solution level of an electrolyte solution rises to a position in the vicinity of the middle lid, there is a possibility that the communication hole is closed by a surface tension of the electrolyte solution or the like and hence, a gas release passage is no more formed. When the gas release passage is no more formed, the solution level of the electrolyte solution in the exhaust sleeve rises due to the pressure difference and, as a result, a leakage of the electrolyte solution from the outlet of the exhaust sleeve occurs.

The present specification discloses a technique for suppressing a leakage of an electrolyte solution which may be caused by rising of a solution level of an electrolyte solution.

According to an aspect of a technique disclosed in the present specification, there is provided a lead-acid battery which includes a container storing a plurality of electrodes and an electrolyte solution and a lid member fixed to an upper portion of the container. The lid member includes a lid plate configured to seal an opening of the container; a cylindrical exhaust sleeve formed in the lid plate in a penetrating manner and configured to discharge a gas generated in the container therethrough; and a recessed portion disposed adjacently to the exhaust sleeve and formed on an inner surface of the lid plate in an outwardly recessed manner. The exhaust sleeve has a communication hole which communicates with the inside of the recessed portion and the inside of the exhaust sleeve.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Summary of Embodiment

Figure 1:
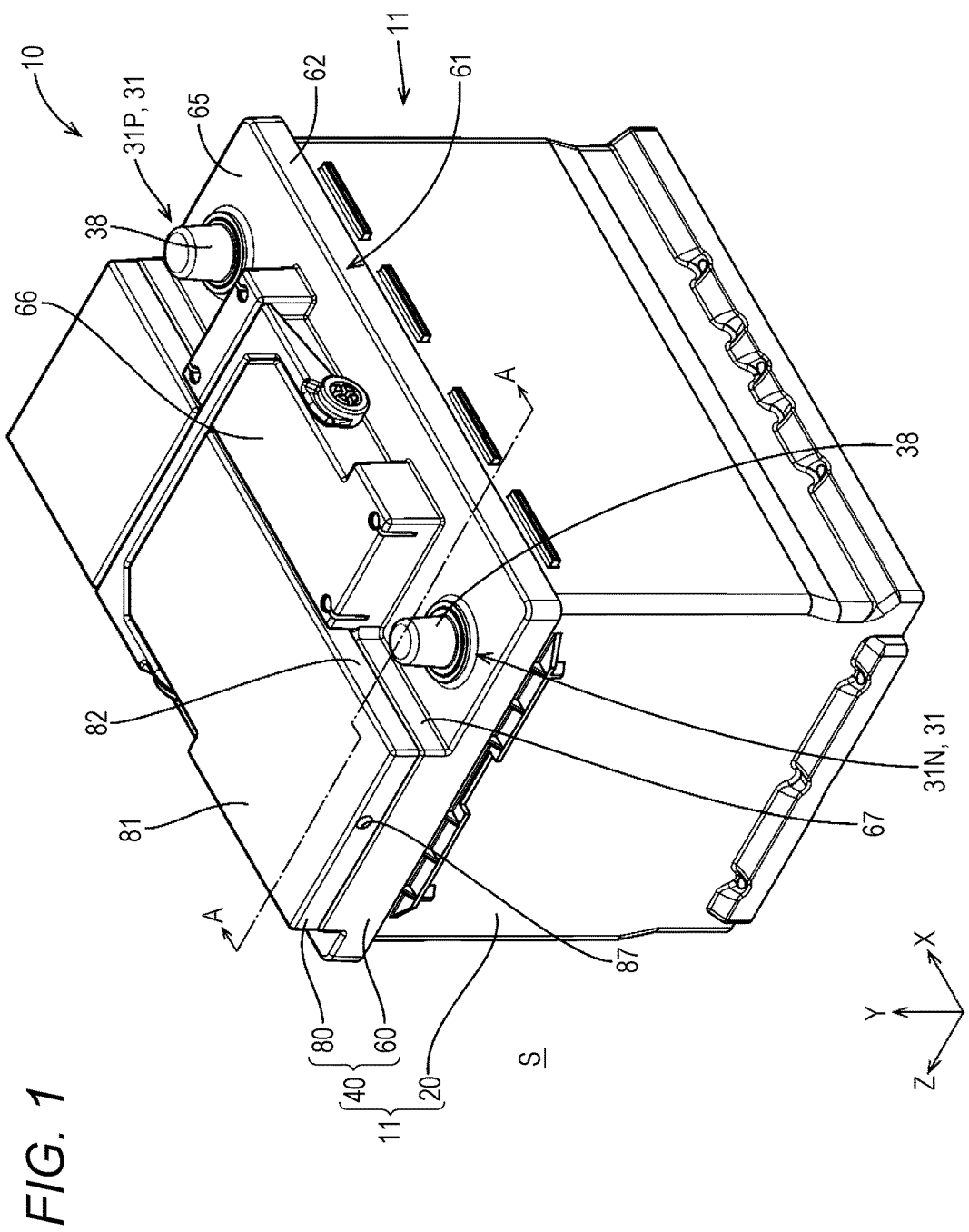
FIG. 1 is a perspective view of a lead-acid battery.

First, the summary of a lead-acid battery according to this embodiment is described.

The lead-acid battery disclosed in the present specification includes a container storing a plurality of electrodes and an electrolyte solution and a lid member fixed to an upper portion of the container. The lid member includes a lid plate configured to seal an opening of the container; a cylindrical exhaust sleeve formed in the lid plate in a penetrating manner and configured to discharge a gas generated in the container therethrough; and a recessed portion disposed adjacently to the exhaust sleeve and formed on an inner surface of the lid plate in an outwardly recessed manner. The exhaust sleeve has a communication hole which communicates with the inside of the recessed portion and the inside of the exhaust sleeve.

The inventors of the present specification have made an attempt to identify a cause of a phenomenon that a solution droplet leaks to the outside from an outlet of an exhaust sleeve when a solution level of an electrolyte solution rises due to overcharging or the like in spite of a fact that a communication hole which allows a gas to flow between the inside and the outside of the exhaust sleeve is formed in the exhaust sleeve.

In their attempt, the inventors have observed a passage through which an electrolyte solution intrudes into the exhaust sleeve, and have finally made finding that when a solution level rises and approaches a lower surface (inner surface) of a lid plate, an opening region of the communication hole is made small, and the communication hole whose opening region is made small is closed due to a solution film formed by a surface tension of the electrolyte solution. Based on such finding, the inventors have identified that when a gas release passage is no more formed outside the exhaust sleeve, the solution level of the electrolyte solution in the exhaust sleeve rises so that the electrolyte solution leaks to the outside from the exhaust sleeve.

In view of the above, the inventors of the present specification have arrived at an idea of providing a recessed portion which is recessed more upward (more outward) than a lower surface (inner surface) of the lid plate at a position disposed adjacently to the exhaust sleeve and forming a communication hole which communicates with the inside of the recessed portion and the inside of the exhaust sleeve in a wall portion which forms the exhaust sleeve. That is, by forming the communication hole at the position higher than the lower surface (inner surface) of the lid plate, even when a solution level of an electrolyte solution approaches the lower surface (inner surface) of the lid plate, it is possible to suppress a phenomenon that the opening region of the communication hole is made small to an extent that the communication hole is closed by a solution film of the electrolyte solution. That is, a gas is allowed to flow between the inside and the outside of the exhaust sleeve through the communication hole and hence, it is possible to suppress the generation of a pressure difference between the inside and the outside of the exhaust sleeve. Thereby, it is possible to suppress a leakage of an electrolyte solution from the outlet of the exhaust sleeve due to the pressure difference between the inside and the outside of the exhaust sleeve.

The lead-acid battery disclosed in the present specification may have the following configuration.

As one aspect of the lead-acid battery disclosed in the present specification, the exhaust sleeve may have a projecting portion which projects toward the inside of the exhaust sleeve.

Due to the formation of the communication hole at the position higher than the lid plate, the communication hole approaches the outlet of the exhaust sleeve and hence, there is a concern of a leakage of an electrolyte solution accompanying with a gas which passes through the communication hole. However, with the above-mentioned configuration, an electrolyte solution which passes through the communication hole is blocked by the projecting portion which projects toward the inside of the exhaust sleeve and hence, a leakage of the electrolyte solution can be suppressed.

As another aspect of the lead-acid battery disclosed in the present specification, the wall portion of the exhaust sleeve having the communication hole may extend downward toward the inside of the container from a lower surface of the projecting portion.

With such a configuration, the recessed portion can be formed in a space below the projecting portion by making use of the wall portion having the communication hole and the projecting portion.

As another aspect of the lead-acid battery disclosed in the present specification, the wall portion having the communication hole may be disposed more on a proximal part than on a projecting end of the projecting portion.

For example, in general, when water or the like enters a narrow space from a wide space, water which enters the inside of the narrow space impinges and reflects on an inner wall which forms the narrow space and is concentrated on an outlet of the narrow space. Accordingly, also when an electrolyte solution flows into the inside of the recessed portion which is a narrow space from the container which is a wide space, in the same manner as the above-mentioned case, the electrolyte solution which enters the inside of the recessed portion impinges and reflects on an inner wall of the recessed portion. Hence, the electrolyte solution is concentrated on the communication hole. Then, a pressure of the electrolyte solution and a gas which enters the inside of the exhaust sleeve through the communication hole is increased due to the concentration of the electrolyte solution on the communication hole. Hence, the electrolyte solution which enters the inside of the exhaust sleeve and the electrolyte solution accompanying with a gas which enters the inside of the exhaust sleeve through the communication hole directly splashes upward through the communication hole.

However, with the above-mentioned configuration, a projecting end of the projecting portion projects more toward the inside of the exhaust sleeve than the communication hole and hence, splashing of the electrolyte solution can be suppressed by the projecting portion. Accordingly, for example, compared with the case where the wall portion having the communication hole is disposed on the projecting end of the projecting portion, it is possible to suppress a leakage of the electrolyte solution directly splashing upward through the communication hole from the exhaust sleeve.

As another aspect of the lead-acid battery disclosed in the present specification, on an opposedly-facing wall portion of the exhaust sleeve which opposedly faces the wall portion having the communication hole, the projecting portion may be formed at a position above the communication hole.

For example, as described above, when a pressure of an electrolyte solution which enters the inside of the exhaust sleeve from the communication hole is increased, there may be a case where the electrolyte solution which enters the inside of the exhaust sleeve splashes upward after impinging on the opposedly-facing wall portion. However, with the above-mentioned configuration, even when the electrolyte solution impinges on the opposedly-facing wall portion and splashes upward, splashing of the electrolyte solution can be suppressed by the projecting portion formed on the opposedly-facing wall portion. Hence, a leakage of the electrolyte solution from the exhaust sleeve can be suppressed.

As another aspect of the lead-acid battery disclosed in the present specification, the lid member may be configured such that a return flow passage which allows a solution droplet to return to the inside of the container is formed on an upper surface of the lid plate, and the recessed portion is formed at a position which is other than a position where the return flow passage is formed as viewed in an axial direction of the exhaust sleeve.

With such a configuration, the recessed portion is formed at a position which is other than a position where the return flow passage is formed on the upper surface of the lid plate. Accordingly, for example, it is possible to prevent the occurrence of the case where the flow of a solution droplet in the return flow passage is disrupted due to the configuration where the recessed portion is formed at the position below the return flow passage and the wall portion which forms the recessed portion projects toward a return flow passage side.

As another aspect of the lead-acid battery disclosed in the present specification, an inner surface of the lid plate may have a first surface region and a second surface region disposed adjacently to the first surface region at a position disposed adjacently to the exhaust sleeve, and the first surface region may be recessed outward with respect to the second surface region thus forming the recessed portion.

With such a configuration, the first surface region forms the recessed portion by being recessed outward with respect to the second surface region. Accordingly, it is possible to allow a gas to flow between the inside and the outside of the exhaust sleeve through the communication hole which communicates with the inside of the recessed portion and the inside of the exhaust sleeve. That is, it is possible to suppress the generation of a pressure difference between the inside and the outside of the exhaust sleeve and hence, it is possible to suppress a leakage of an electrolyte solution from the outlet of the exhaust sleeve.

As another aspect of the lead-acid battery disclosed in the present specification, the communication hole formed in the exhaust sleeve may be a slit extending to the first surface region.

With such a configuration, even when a solution level of an electrolyte solution approaches an inner surface of the lid plate, it is possible to suppress a phenomenon that the opening region of the communication hole is made small to an extent that the communication hole is closed by a solution film of the electrolyte solution. That is, a gas is allowed to flow between the inside and the outside of the exhaust sleeve through the communication hole and hence, it is possible to suppress the generation of a pressure difference between the inside and the outside of the exhaust sleeve. Thereby, it is possible to suppress a leakage of an electrolyte solution from the outlet of the exhaust sleeve due to the pressure difference between the inside and the outside of the exhaust sleeve.

As another aspect of the lead-acid battery disclosed in the present specification, the communication hole formed in the exhaust sleeve may extend into a cavity defined by the recessed portion.

With such a configuration, even when a solution level of an electrolyte solution approaches an inner surface of the lid plate, it is possible to suppress a phenomenon that the opening region of the communication hole is made small to an extent that the communication hole is closed by a solution film of the electrolyte solution. That is, a gas is allowed to flow between the inside and the outside of the exhaust sleeve through the communication hole extending into the inside of the cavity and hence, it is possible to suppress the generation of a pressure difference between the inside of the exhaust sleeve and the inside of the cavity. Thereby, it is possible to suppress a leakage of an electrolyte solution from the outlet of the exhaust sleeve due to the pressure difference between the inside and the outside of the exhaust sleeve.

Embodiment

One embodiment of a technique disclosed in the present specification is described with reference to FIG. 1 to FIG. 10.

Figure 2:
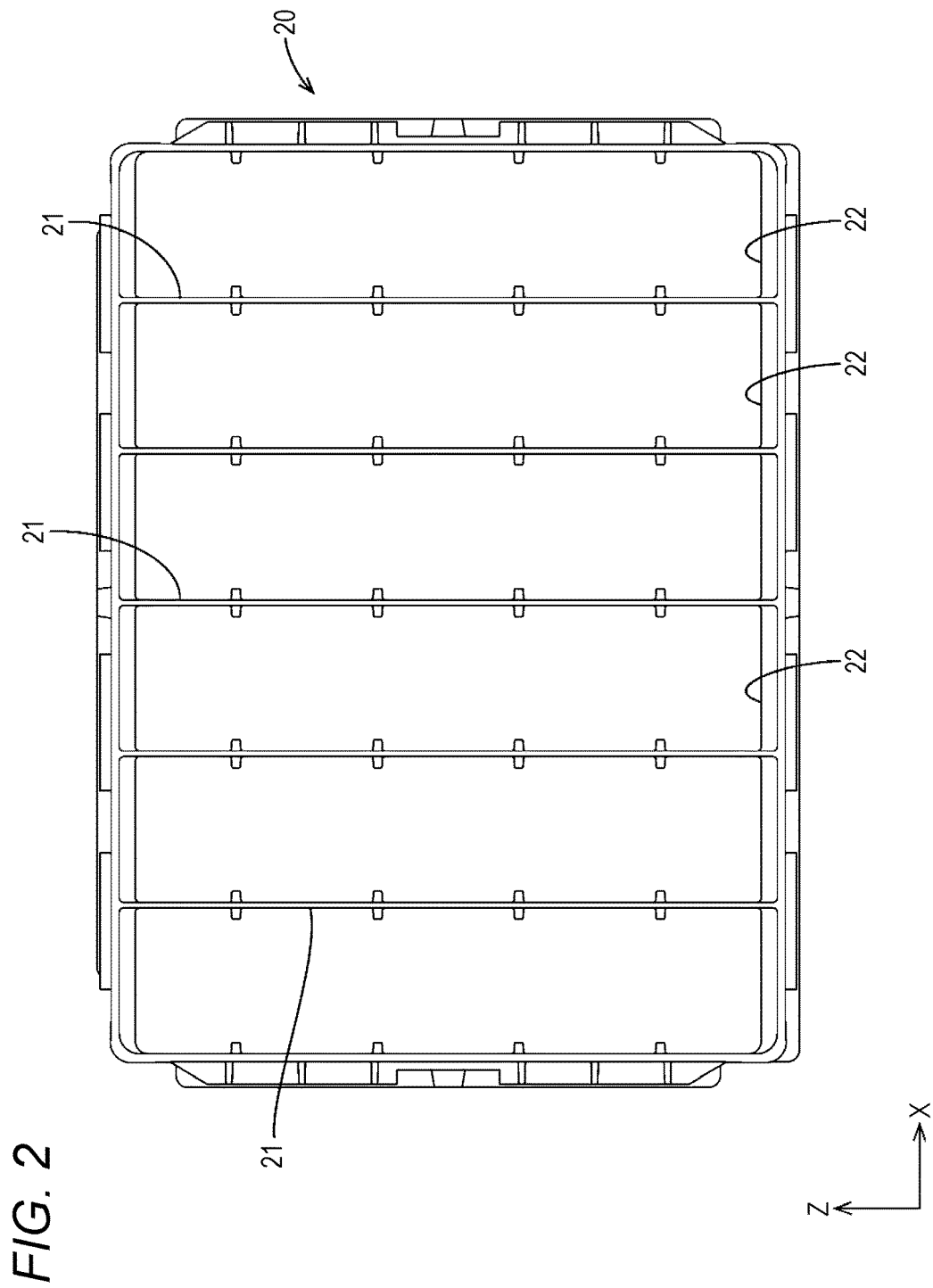
FIG. 2 is a plan view of a container.
Figure 3:
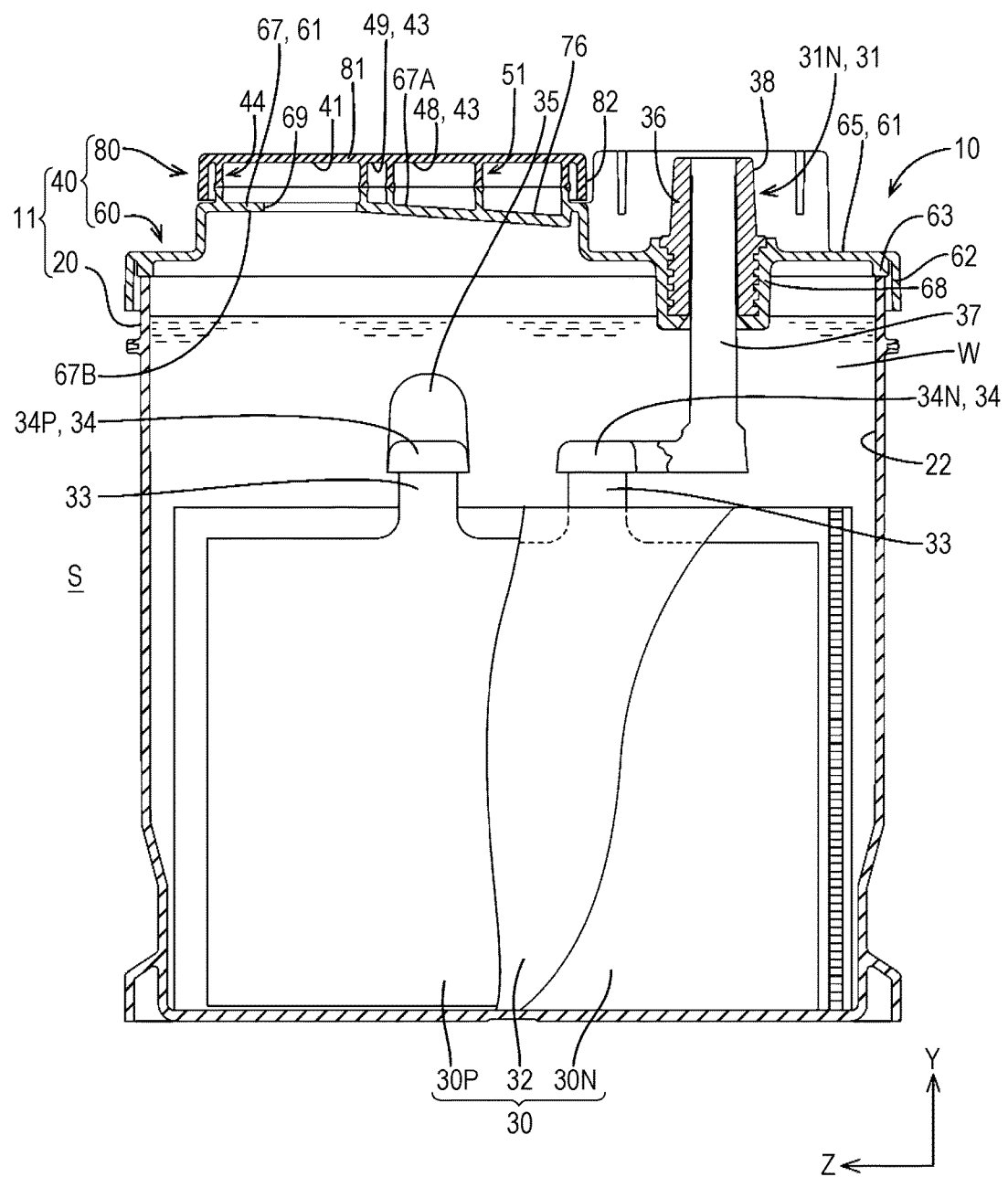
FIG. 3 is a cross-sectional view taken along a line A-A in FIG. 1.

A lead-acid battery 10 is a lead-acid battery for a vehicle such as an automobile. The lead-acid battery 10 is disposed in an engine room or in a luggage space of the vehicle, for example, and supplies electric power to the vehicle. The lead-acid battery 10 is a flooded-type lead-acid battery and, as shown in FIG. 1 to FIG. 3, includes a battery case 11, elements 30, an electrolyte solution W, and a pair of terminal portions 31. In the description made hereinafter, the description is made assuming that a Y axis direction is a vertical direction of the battery case 11 in a state where the battery case 11 is disposed on an installation surface horizontally with no inclination, an X axis direction is a lateral direction of the battery case 11 along which the pair of terminal portions 31 is arranged, and a Z axis direction is a depth direction of the battery case 11.

As shown in FIG. 3, the battery case 11 includes a container 20 which houses the elements 30 and the electrolyte solution W therein, and a lid member 40 which is assembled to an upper portion of the container 20. The container 20 is made of a synthetic resin and, as shown in FIG. 2 and FIG. 3, is formed into a box shape which opens upward in an approximately rectangular shape. The container 20 has a plurality of (five in this embodiment) container partitions 21 in the inside thereof. The container partitions 21 are formed substantially at equal intervals in the lateral direction. The inside of the container 20 is divided into a plurality of sections by the container partitions 21 so that a plurality of (six in this embodiment) cell chambers 22 are formed in the container 20 in a row in the lateral direction. In each cell chamber 22, the element 30 and an electrolyte solution W made of a dilute sulfuric acid are stored.

As shown in FIG. 3, the element 30 includes: a plate-like positive electrode plate 30P (one example of "electrode"); a plate-like negative electrode plate 30N (one example of "electrode"); and a separator 32 which separates both plates 30P, 30N from each other. In this embodiment, the plate-like plate is used as one example of the electrode. However, the electrode is not limited to the plate-like plate, and the electrode may be formed into a circular columnar shape, for example.

Each plate 30P, 30N is formed by filling a grid with an active material, and a lug portion 33 is formed on an upper portion of each plate 30P, 30N. The lug portions 33 of the plates 30P, 30N having the same polarity are connected to each other by means of a strap 34 in the cell chamber 22. A main component of the active material of the positive electrode plate 30P is lead dioxide, and a main component of an active material of the negative electrode plate 30N is lead.

The strap 34 is formed into a plate shape extending in the lateral direction, and a strap 34P for a positive electrode and a strap 34N for a negative electrode are provided for each cell chamber 22. By electrically connecting the straps 34 in the cell chambers 22 disposed adjacently to each other through connecting portions 35 formed on the straps 34, the elements 30 in the respective cell chambers 22 are connected in series.

As shown in FIG. 1 and FIG. 3, the lid member 40 is assembled to the container 20 from above, and is fixed to the container 20. The lid member 40 includes a middle lid 60, and an upper lid 80 which is assembled to the middle lid 60 from above.

Figure 4:
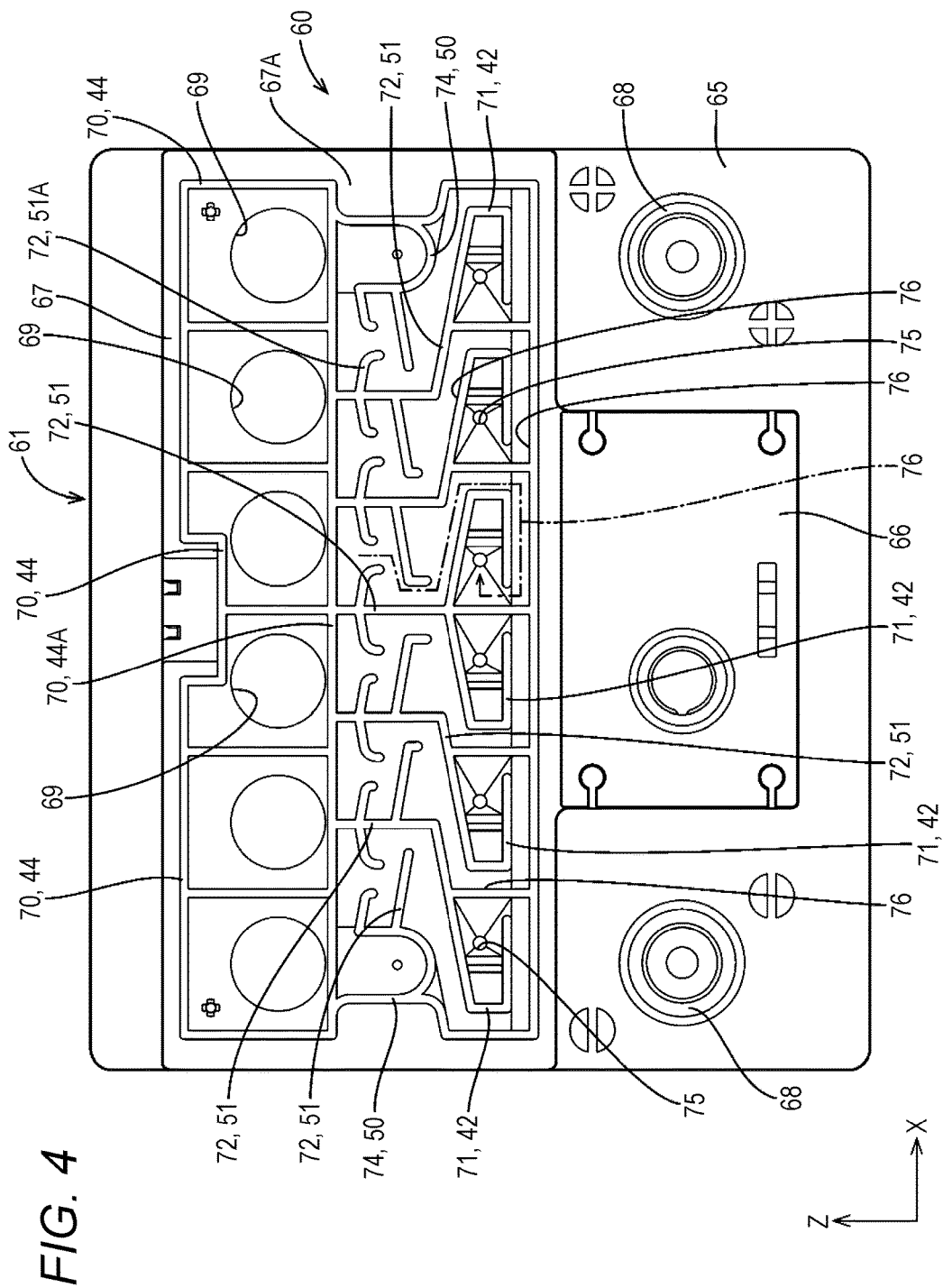
FIG. 4 is a plan view of a middle lid.
Figure 5:
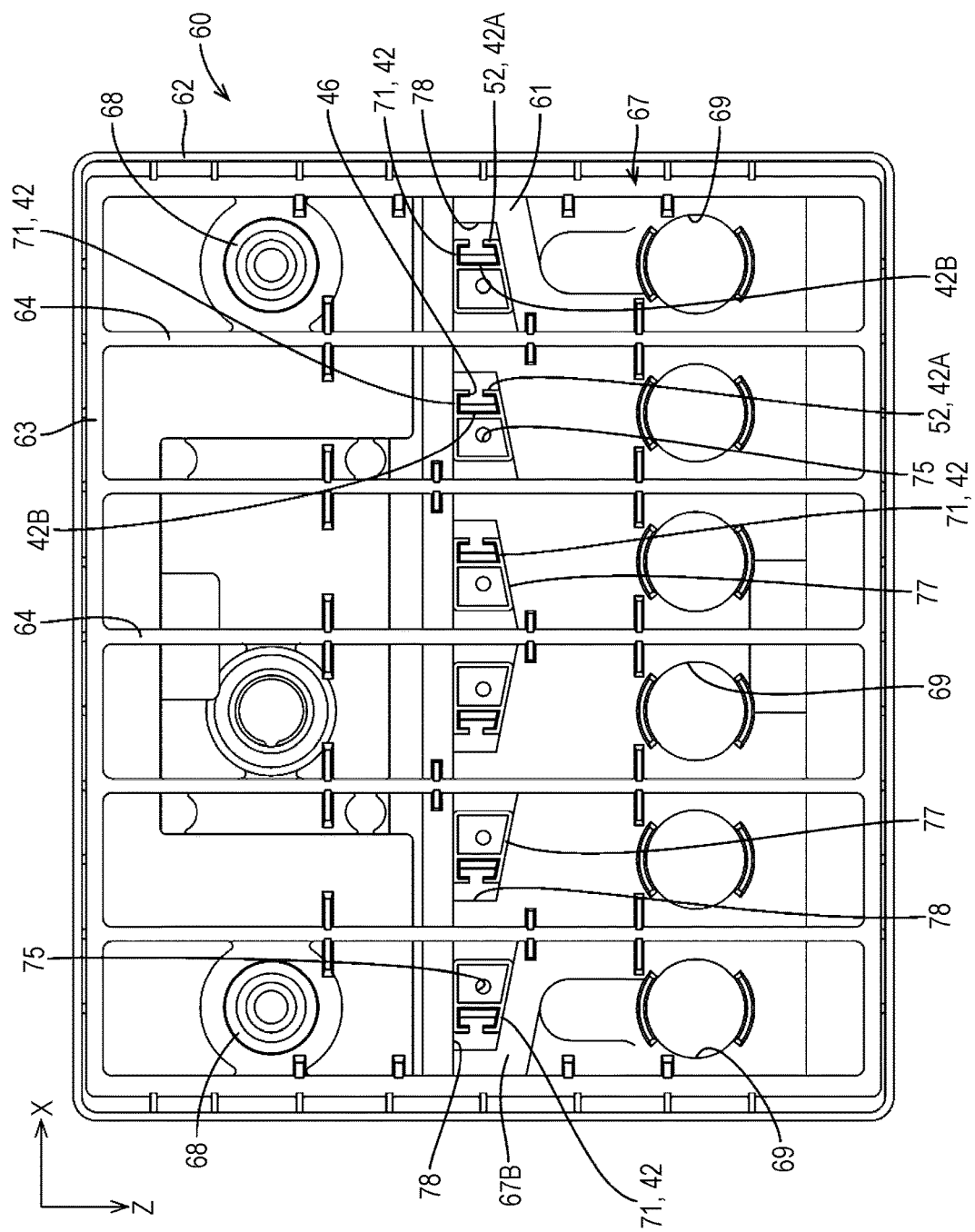
FIG. 5 is a bottom view of the middle lid.

The middle lid 60 is made of a synthetic resin. As shown in FIG. 4 and FIG. 5, the middle lid 60 includes a lid plate 61 having an approximately rectangular shape as viewed in a plan view, and a flange portion 62 formed on an outer peripheral edge of the lid plate 61 so as to surround the lid plate 61. FIG. 4 is a plan view of the middle lid 60 as viewed from above in a state where the upper lid 80 is removed, and FIG. 5 is a bottom view of the middle lid 60 as viewed from below.

The lid plate 61 has a size which allows the lid plate 61 to seal an upper surface of the container 20. As shown in FIG. 5, on a lower surface of the lid plate 61, a peripheral wall 63 which extends along the flange portion 62 and a plurality of lid partitions 64 which are formed continuously with an inner surface of the peripheral wall 63 are formed.

The peripheral wall 63 projects downward from the lower surface of the lid plate 61. The peripheral wall 63 is formed into an approximately rectangular shape so as to correspond to an edge portion of an opening of the container 20.

In the same manner as the peripheral wall 63, the lid partition 64 projects downward from the lower surface of the lid plate 61. The respective lid partitions 64 are formed so as to partition the inside of the peripheral wall 63 corresponding to the respective container partitions 21 of the container 20. By making the peripheral wall 63 overlap with the edge portion of the opening of the container 20 and the lid partitions 64 overlap with the container partitions 21 of the container 20 and by joining these members to each other by thermal welding, it is possible to ensure airtightness between the peripheral wall 63 and the container 20 and airtightness between the lid partitions 64 and the container partitions 21.

As shown in FIG. 1 and FIG. 4, the lid plate 61 is formed into a shape where the difference in height is made among portions. That is, the lid plate 61 includes a low surface portion 65, a high surface portion 66, and a plateau portion 67. The low surface portion 65 is disposed on a rear edge portion and a front portion of the lid plate 61. Terminal portions 31 which form a pair are disposed on both left and right sides of the front portion of the low surface portion 65 respectively. Out of the pair of terminal portions 31, one terminal portion 31 forms a positive terminal portion 31P, and the other terminal portion 31 forms a negative terminal portion 31N.

The positive terminal portion 31P and the negative terminal portion 31N have the same shape and hence, the description is made hereinafter by taking the negative terminal portion 31N as an example.

As shown in FIG. 3, the negative terminal portion 31N includes: a bushing 36 having an approximately circular cylindrical shape; and a pole 37 fitted in the bushing 36.

The bushing 36 is made of metal such as a lead alloy. As shown in FIG. 3, the bushing 36 is embedded in a cylindrical mounting portion 68 formed integrally with the low surface portion 65 so that the bushing 36 is integrally fixed to the cylindrical mounting portion 68. An upper half of the bushing 36 forms a terminal connecting portion 38 to which a harness terminal not shown in the drawing is connected. In a state where the bushing 36 is fixed to the mounting portion 68, the terminal connecting portion 38 projects upward from the low surface portion 65.

The pole 37 is made of metal such as a lead alloy, and is formed into an approximately circular columnar shape having a length larger than a length of the bushing 36. An upper half of the pole 37 is fitted in the bushing 36, and an upper end portion of the pole 37 is joined to the bushing 36 by welding. Meanwhile, a lower half of the pole 37 projects downward from a lower surface of the bushing 36, and a lower end portion of the pole 37 is joined to the straps 34 of the elements 30.

The high surface portion 66 is disposed between the positive terminal portion 31P and the negative terminal portion 31N, and an upper surface of the high surface portion 66 is set at a higher position than upper surfaces of the pair of terminal portions 31. With such a configuration, even if a metal member or the like is placed on the lead-acid battery 10, it is possible to suppress a phenomenon that the positive terminal portion 31P and the negative terminal portion 31N are short-circuited with each other by a metal member or the like.

As shown in FIG. 4, the plateau portion 67 has an approximately rectangular shape as viewed in a plan view, and is formed at a position slightly offset rearwardly from a center portion of the lid plate 61 in the depth direction. The plateau portion 67 is formed into a shape extending in the lateral direction so as to traverse the respective cell chambers 22 of the container 20. An upper surface 67A of the plateau portion 67 is set at a position higher than the low surface portion 65 and lower than the high surface portion 66.

Electrolyte solution filling holes 69 each of which is formed for each corresponding cell chamber 22 are disposed on a rear portion of the plateau portion 67 such that the electrolyte solution filling holes 69 are arranged in a row in the lateral direction. The respective electrolyte solution filling holes 69 vertically penetrate the plateau portion 67, and the respective cell chambers 22 of the container 20 are filled with the electrolyte solution W through the electrolyte solution filling holes 69.

Figure 6:
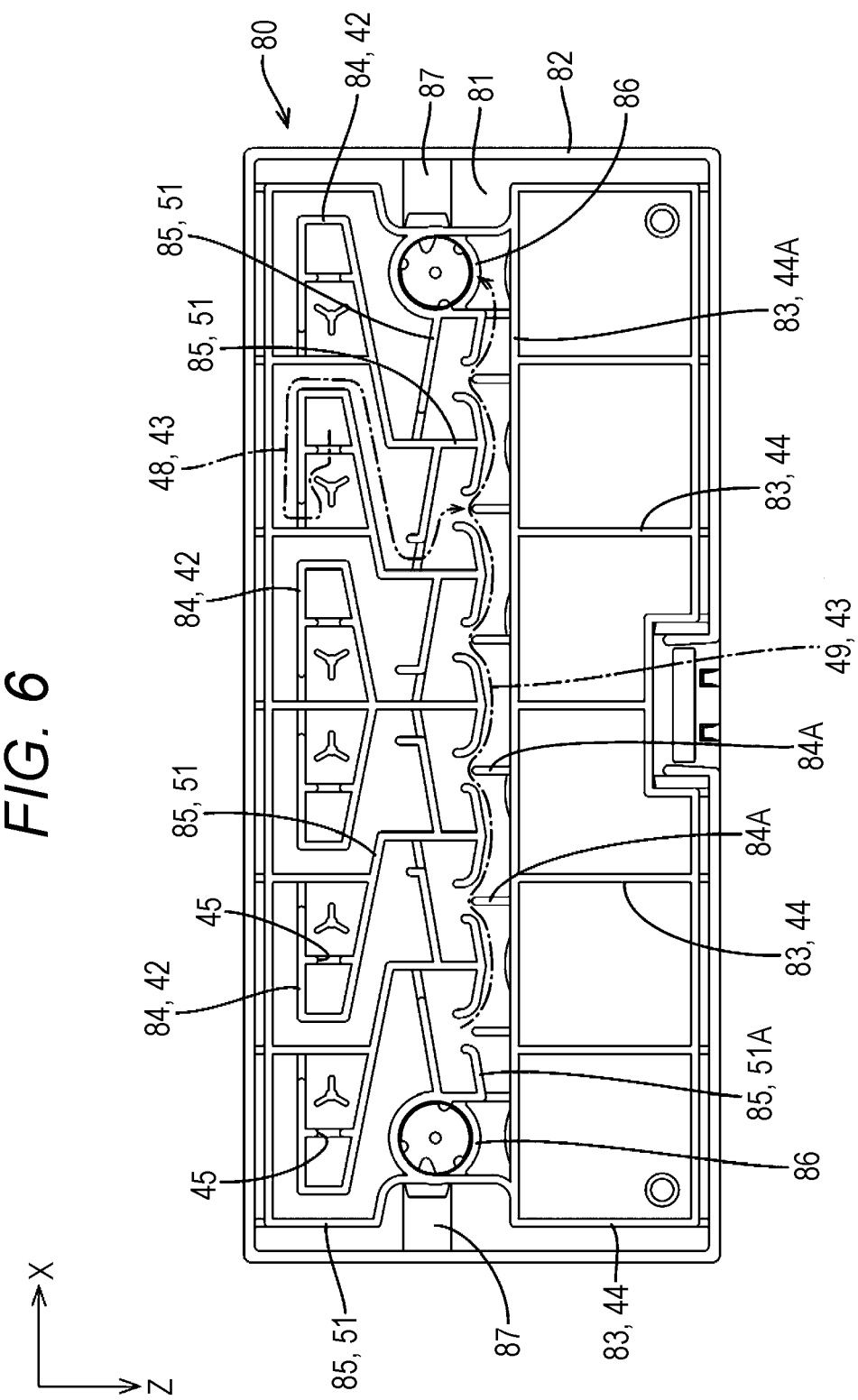
FIG. 6 is a bottom view of an upper lid.

Meanwhile, the upper lid 80 is made of a synthetic resin and, as shown in FIG. 1, the upper lid 80 is mounted on the plateau portion 67 of the middle lid 60 from above. As shown in FIG. 6, the upper lid 80 has substantially the same outer peripheral shape as the plateau portion 67 of the middle lid 60, and is formed such that an outer peripheral wall 82 is formed on an outer peripheral edge of an upper lid body 81 having an approximately rectangular flat plate shape. FIG. 6 is a bottom view of the upper lid 80 as viewed from below.

As shown in FIG. 3, in the lid member 40, between the middle lid 60 and the upper lid 80, an exhaust space 43 which allows a plurality of exhaust sleeves 42 and an external space S disposed outside the battery case 11 to communicate each other, and a plurality of closed spaces 41 are formed.

As shown in FIG. 4 and FIG. 6, the plurality of closed spaces 41 are formed by a plurality of surrounding walls 44 formed corresponding to the respective electrolyte solution filling holes 69 formed in the plateau portion 67, and the plurality of surrounding walls 44 are arranged continuously in the lateral direction such that respective front walls 44A of the surrounding walls 44 are arranged in a row on a straight line in the lateral direction. The respective surrounding walls 44 are formed by making middle-lid surrounding walls 70 each of which has a frame-like shape and is raised upward from the plateau portion 67 such that each middle-lid surrounding wall 70 surrounds the electrolyte solution filling hole 69 and a plurality of upper-lid surrounding walls 83 which have a frame-like shape and extend downward from the upper lid 80 overlap with each other in the vertical direction. By joining the upper-lid surrounding walls 83 and the middle-lid surrounding walls 70 to each other by thermal welding, it is possible to ensure airtightness of the surrounding wall 44 between the upper-lid surrounding walls 83 and the middle-lid surrounding walls 70.

Figure 10:
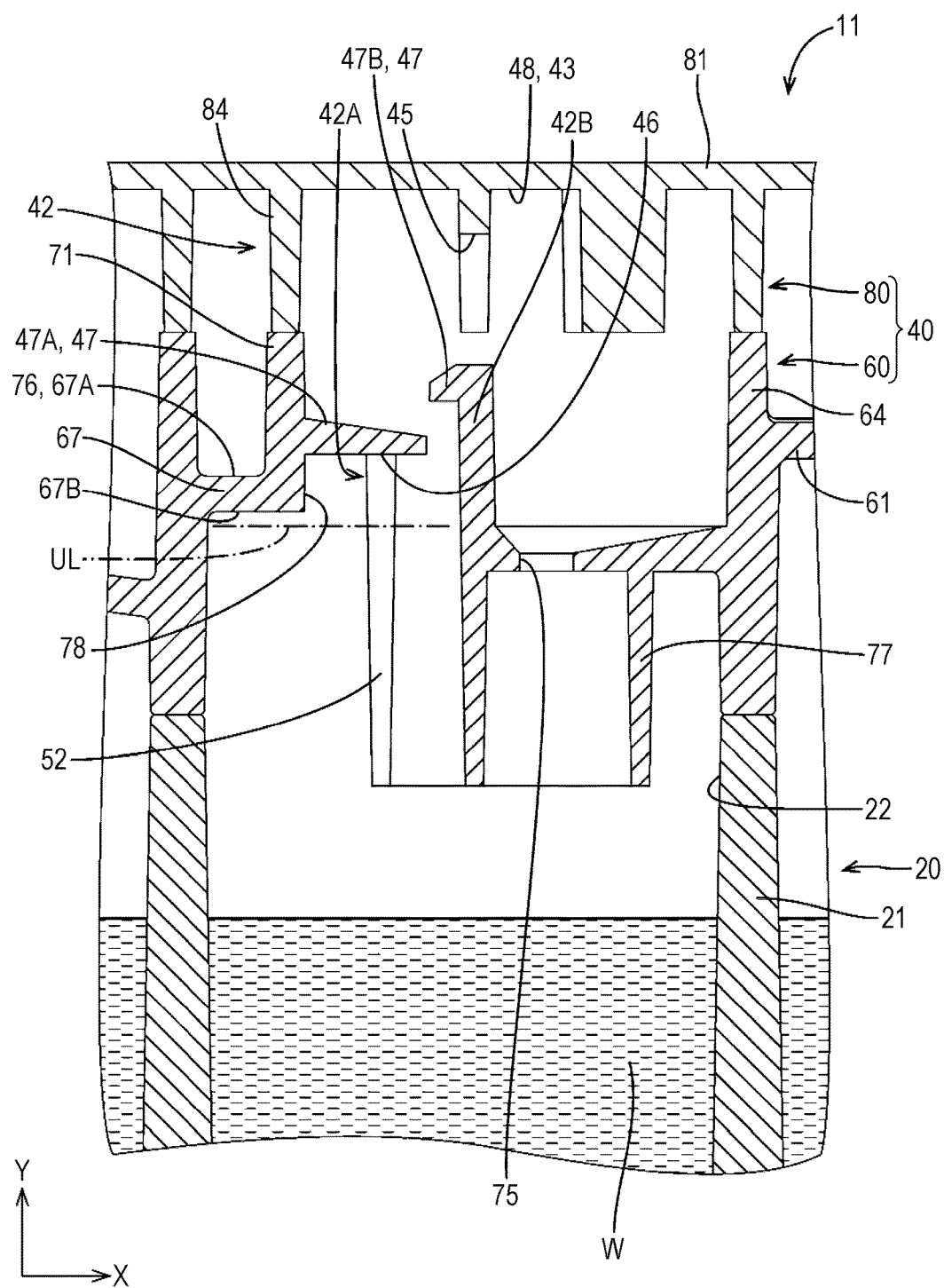
FIG. 10 is a cross-sectional view showing a state where the container, the middle lid and the upper lid are fixed to each other, and is also an enlarged cross-sectional view of a main part corresponding to a cross section taken along a line B-B in FIG. 8.

As shown in FIG. 4, the plurality of exhaust sleeves 42 are arranged in a row in the lateral direction corresponding to the respective cell chambers 22 of the container 20. Each exhaust sleeve 42 is formed into an angular cylindrical shape by four plate-like wall portions. As shown in FIG. 10, the exhaust sleeve 42 is formed by overlapping an upper-lid sleeve portion 84 which extends downward from the upper lid body 81 of the upper lid 80 in an angular cylindrical shape on a middle-lid sleeve portion 71 which has an angular cylindrical shape, penetrates the plateau portion 67 of the lid plate 61 in the vertical direction, and faces the inside of the cell chamber 22. By joining the middle-lid sleeve portions 71 and the upper-lid sleeve portions 84 to each other by thermal welding, it is possible to ensure airtightness between the middle-lid sleeve portions 71 and the upper-lid sleeve portions 84.

An exhaust hole 45 which allows the exhaust space 43 and the inside of the exhaust sleeve 42 to communicate with each other is formed in a portion of the exhaust sleeve 42 which is formed of the upper-lid sleeve portion 84. That is, an internal space of the exhaust sleeve 42 communicates with the inside of the cell chamber 22, and also communicates with the inside of the exhaust space 43. Accordingly, a gas generated in the respective cell chambers 22 passes through the exhaust sleeve 42 and, thereafter, is discharged to the exhaust space 43 through the exhaust hole 45 which forms an outlet of the exhaust sleeve 42.

As shown in FIG. 5 and FIG. 10, each exhaust sleeve 42 has a communication hole 46 which allows the inside and the outside of the exhaust sleeve 42 to communicate with each other. The communication hole 46 is formed in a hole-formed wall portion 42A which is one of left and right wall portions out of four wall portions forming the exhaust sleeve 42. Each communication hole 46 is formed into a slit-like shape extending upward linearly from a lower end portion of the exhaust sleeve 42 in a state where the communication hole 46 penetrates the hole-formed wall portion 42A of the exhaust sleeve 42 in the lateral direction. When a solution level of the electrolyte solution W rises due to overcharging or the like, the communication hole 46 allows a gas and the electrolyte solution W to flow between the inside and the outside of the exhaust sleeve 42. Hence, the generation of a pressure difference between the inside and the outside of the exhaust sleeve 42 can be suppressed. Accordingly, it is possible to suppress a phenomenon that a solution level of the electrolyte solution W in the exhaust sleeve 42 easily rises due to the generation of a pressure difference between the inside and the outside of the exhaust sleeve 42 when the solution level of the electrolyte solution W rises. As a result, it is possible to suppress a phenomenon that the electrolyte solution W is easily leaked from the exhaust sleeve 42 through the exhaust hole 45.

As shown in FIG. 10, a plurality of (two in this embodiment) projecting portions 47 are formed on an inner surface of the exhaust sleeve 42. With respect to the plurality of projecting portions 47 formed on wall portions of the exhaust sleeve 42, one projecting portion 47 is formed on an oppositely-facing wall portion 42B which oppositely faces the hole-formed wall portion 42A in the lateral direction, and the other projecting portion 47 is formed on the hole-formed wall portion 42A such that these projecting portions 47 are positionally displaced from each other in the vertical direction.

A first projecting portion 47A which is the projecting portion 47 formed on the hole-formed wall portion 42A is disposed above the plateau portion 67 of the lid plate 61. A second projecting portion 47B which is the projecting portion 47 formed on the oppositely-facing wall portion 42B is disposed further above the first projecting portion 47A.

That is, as shown in FIG. 10, in the inside of the exhaust sleeve 42, a flow passage which meanders in the lateral direction by the plurality of projecting portions 47 is formed. With such a configuration, an electrolyte solution W which splashes upward from the cell chamber 22 minimally intrudes into an upper portion of the exhaust sleeve 42.

Figure 7:
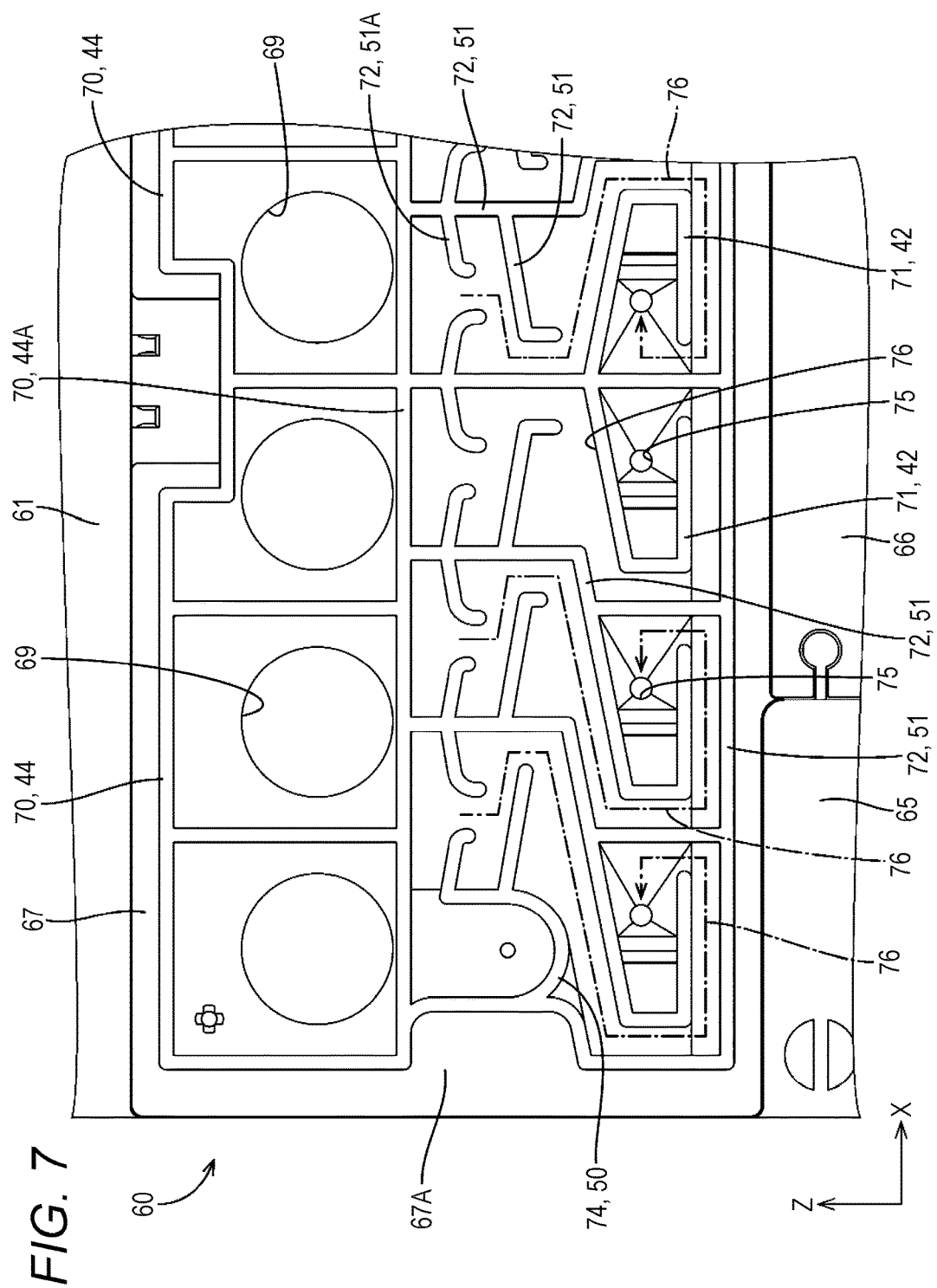
FIG. 7 is an enlarged plan view of a main part in FIG. 4.
Figure 8:
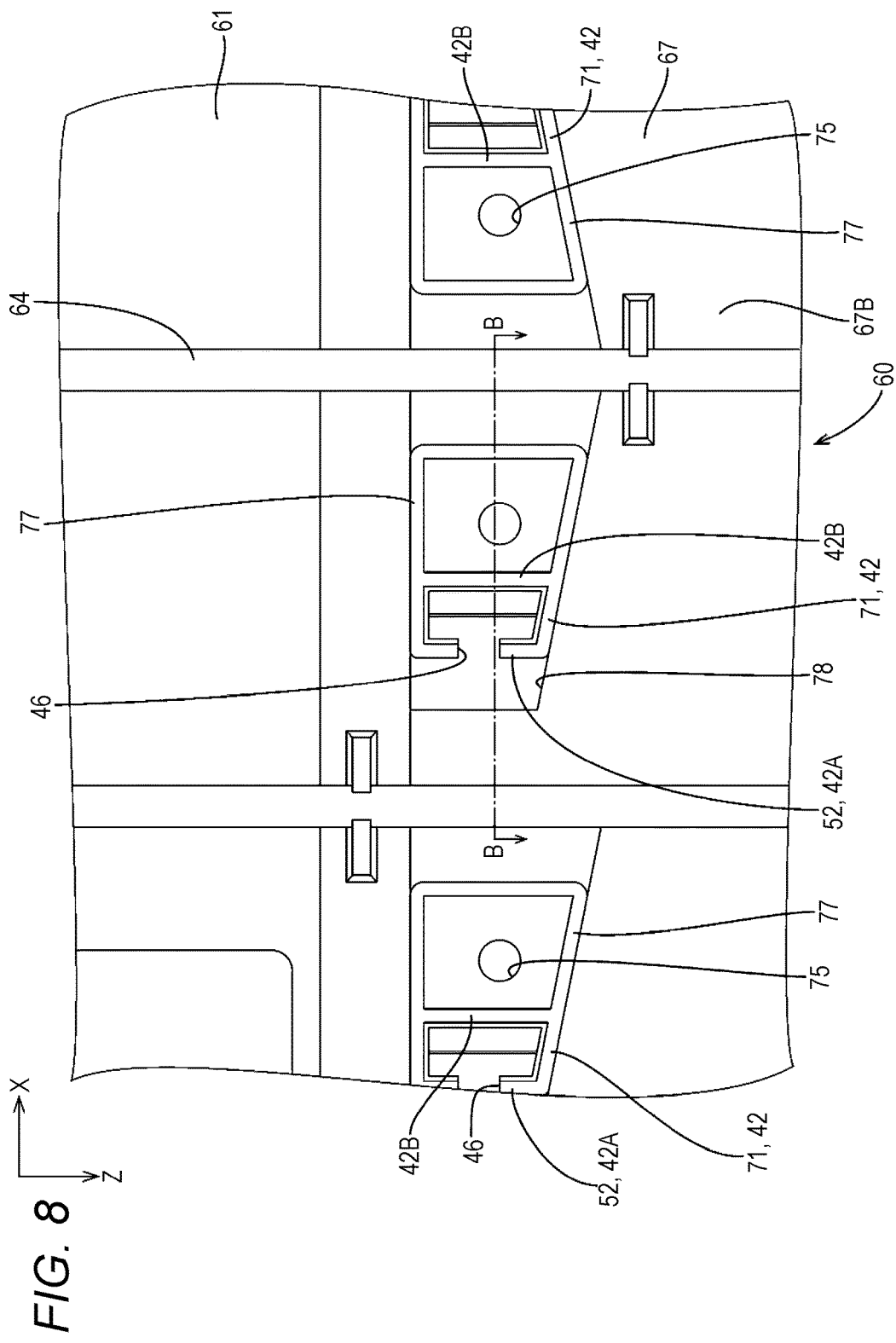
FIG. 8 is an enlarged bottom view of a main part in FIG. 5.
Figure 9:
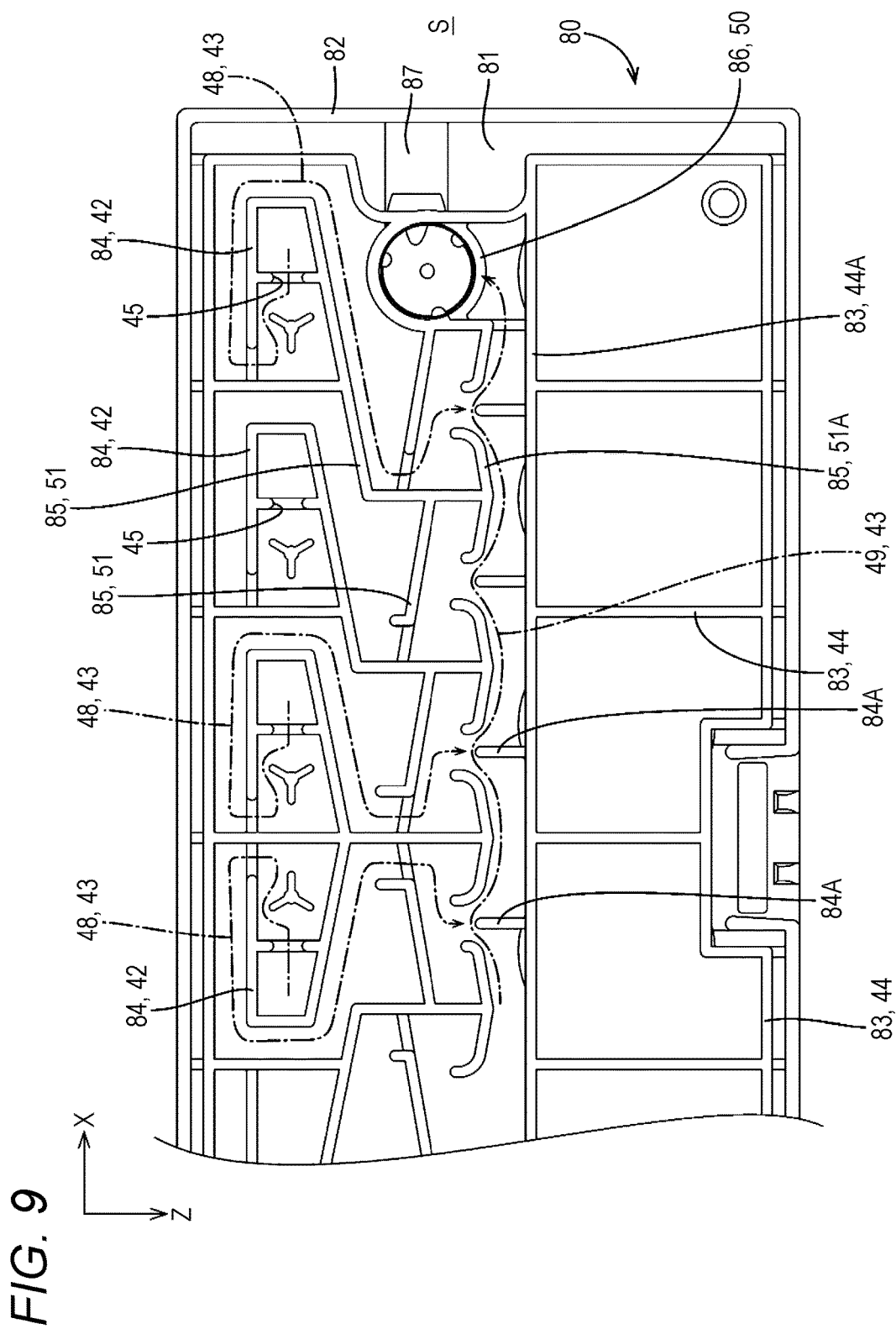
FIG. 9 is an enlarged bottom view of a main part in FIG. 6.

Meanwhile, as shown in FIG. 6, FIG. 7 and FIG. 9, the exhaust space 43 is formed of a plurality of exhaust passages 48 formed for the respective cell chambers 22 of the container 20, a common passage 49 communicating with the plurality of exhaust passages 48, and collective exhaust portions 50 disposed on both left and right sides of the common passage 49.

Each exhaust passage 48 is disposed between passage walls 51 formed by making the middle-lid passage walls 72 which extend upward from the plateau portion 67 and the upper-lid passage walls 85 which extend downward from the upper lid body 81 overlap with each other in the vertical direction. With respect to a route of each exhaust passage 48, the exhaust passage 48 starts from the position where the exhaust hole 45 is formed in the exhaust sleeve 42, is disposed adjacently to a front side and a lateral side of the exhaust sleeve 42 and, thereafter, extends in the rearward direction while meandering in the lateral direction. The middle-lid passage walls 72 and the upper-lid passage walls 85 are joined to each other by thermal welding and hence, the exhaust passage 48 is formed as a passage where airtightness is ensured.

As shown in FIG. 7 and FIG. 9, the common passage 49 is formed between the front walls 44A of the surrounding walls 44 and rear walls 51A of the passage walls 51 such that the common passage 49 communicates with rear end portions of the respective exhaust passages 48. As shown in FIG. 6 and FIG. 9, the common passage 49 extends in the lateral direction in a meandering manner due to the projections 84A which project frontward from the front walls 44A of the surrounding wall 44. The collective exhaust portions 50 are formed on both end portions of the common passage 49 in the lateral direction.

As shown in FIG. 4 and FIG. 6, the collective exhaust portion 50 is formed by making the middle-lid exhaust portion 74 which is formed on the plateau portion 67 of the middle lid 60 in an approximately cylindrical shape and the upper-lid exhaust portion 86 which is formed on the upper lid 80 in an approximately circular cylindrical shape overlap with each other in the vertical direction. By joining the middle-lid exhaust portions 74 and the upper-lid exhaust portions 86 to each other by thermal welding, it is possible to ensure airtightness between the middle-lid exhaust portions 74 and the upper-lid exhaust portions 86.

A porous filter not shown in the drawing is stored in the upper-lid exhaust portion 86 which forms the collective exhaust portion 50. With the provision of the porous filter, the emission of water vapor or acid mist to the external space S and the intrusion of an external spark into the battery are suppressed. An upper end portion of the upper-lid exhaust portion 86 is opened to the outside through a circular cylindrical exhaust duct 87 formed in the upper lid 80. That is, a gas generated in the respective cell chambers 22 of the container 20 is firstly discharged to the exhaust passages 48 through the respective exhaust sleeves 42. Then, the gas discharged to the exhaust passages 48 is flown into the collective exhaust portions 50 through the common passage 49 and, at last, is discharged to the external space S through the exhaust ducts 87. Depending on the use environment, the collective exhaust portions 50 may be used such that the both left and right collective exhaust portions 50 are opened or the collective exhaust portions 50 may be used such that only one of the left and right collective exhaust portions 50 is opened and the other of the left and right collective exhaust portions 50 is sealed by a plug not shown in the drawing.

As shown in FIG. 4, FIG. 5 and FIG. 10, the middle lid 60 has a plurality of (six in this embodiment) return flow holes 75 which are arranged in a row in the lateral direction corresponding to the respective cell chambers 22 of the container 20. Each return flow hole 75 is formed in the plateau portion 67 of the lid plate 61 in a vertically penetrating manner. Each return flow hole 75 communicates with the inside of the cell chamber 22 and the exhaust space 43. As shown in FIG. 7, the return flow hole 75 is disposed at an end portion of the exhaust passage 48 in the vicinity of an exhaust sleeve 42, and is disposed at the position of the exhaust passage 48 remotest from the common passage 49.

As shown in FIG. 3 and FIG. 10, the upper surface 67A of the plateau portion 67 forming the exhaust passage 48 forms return flow passages 76 each of which is inclined downward as the return flow passage 76 approaches the return flow hole 75. As shown in FIG. 4, the return flow hole 75 is disposed at a lower end portion of the return flow passage 76.

That is, moisture contained in a gas generated in the cell chamber 22 condenses in the exhaust passage 48 when the gas passes through the exhaust passage 48, and the condensed solution droplets flow to the return flow hole 75 through the return flow passage 76. Hence, the condensed solution droplets return to the inside of the respective cell chamber 22 through the return flow hole 75. Accordingly, the lowering of an amount of the electrolyte solution W in the container 20 can be suppressed.

As shown in FIG. 5 and FIG. 10, the plateau portion 67 of the lid plate 61 of the middle lid 60 has a plurality of return sleeves 77 each of which surrounds each return flow hole 75. The plurality of return sleeves 77 are formed in a row in the lateral direction. As shown in FIG. 10, the respective return sleeves 77 have an angular cylindrical shape which extends downward from the plateau portion 67 and opens downward. Accordingly, the return sleeve 77 suppresses a phenomenon that when vibrations are applied to the lead-acid battery 10, the electrolyte solution W splashes upward from the inside of the cell chamber 22 and intrudes into the exhaust passage 48 through the return flow hole 75.

As shown in FIG. 5 and FIG. 10, the return sleeve 77 is disposed adjacently to the exhaust sleeve 42 in the lateral direction by using the oppositely-facing wall portion 42B of the exhaust sleeve 42 as a part of the return sleeve 77 in common. Accordingly, a front wall of the exhaust sleeve 42 and a front wall of the return sleeve 77 are made coplanar with each other, and a rear wall of the exhaust sleeve 42 and a rear wall of the return sleeve 77 are made coplanar with each other. A length size of the return sleeve 77 in the depth direction is gradually decreased as the return sleeve 77 extends to an exhaust sleeve 42 side.

With respect to the hole-formed wall portion 42A of the exhaust sleeve 42 in which the communication hole 46 is formed, as shown in FIG. 10, a lower wall portion 52 disposed below the first projecting portion 47A is disposed in a downwardly extending manner at an approximately center portion of the first projecting portion 47A in the lateral direction which is disposed more on a proximal part than on a projecting end of the first projecting portion 47A. In a space below the first projecting portion 47A, the first projecting portion 47A, the lower wall portion 52 and the plateau portion 67 are continuously formed with each other so that a recessed portion 78 which is recessed more upward than a lower surface 67B of the plateau portion 67 is formed.

In other words, the exhaust sleeve 42 is formed such that a portion of the exhaust sleeve 42 below the first projecting portion 47A is formed narrower than a portion of the exhaust sleeve 42 above the first projecting portion 47A. Since a lower part of the exhaust sleeve 42 is narrowed, in the space formed below the first projecting portion 47A and outside the lower wall portion 52 of the exhaust sleeve 42, the recessed portion 78 which is recessed more upward than the lower surface 67B of the plateau portion 67 is formed.

That is, on an inner surface (bottom surface) of the lid plate 61, at a position disposed adjacently to the exhaust sleeve 42, a lower surface (one example of "first surface region") of the first projecting portion 47A and a lower surface 67B (one example of "second surface region") of the plateau portion 67 which is disposed adjacently to the lower surface of the first projecting portion 47A are formed. The lower surface of the first projecting portion 47A is recessed outward (upward) with respect to the lower surface 67B of the plateau portion 67 thus forming the recessed portion 78.

As shown in FIG. 10, a length size of the recessed portion 78 in the depth direction is set substantially equal to a length size of the exhaust sleeve 42 in the depth direction, and a length size of the recessed portion 78 in the lateral direction is set substantially equal to a difference in a length size in the lateral direction between the upper part and the lower part of the exhaust sleeve 42. That is, the recessed portion 78 is formed at a position other than a position where the return flow passage 76 is formed when the plateau portion 67 is viewed in the vertical direction which is an axis direction of the exhaust sleeve 42.

Meanwhile, as shown in FIG. 10, the communication hole 46 is formed such that the communication hole 46 reaches the inside of the recessed portion 78 so as to allow the inside of the recessed portion 78 and the inside of the exhaust sleeve 42 to communicate with each other in the lateral direction. A portion of the exhaust sleeve 42 below the first projecting portion 47A ranging from an upper end position which is a depth portion of the recessed portion 78 to a lower end portion of the projecting portion 47A is opened in the vertical direction through the communication hole 46. That is, the communication hole 46 communicates with the inside of the recessed portion 78 and the inside of the exhaust sleeve 42 at the position higher than the lower surface 67B of the plateau portion 67 of the lid plate 61 of the middle lid 60.

That is, the communication hole 46 forms a slit extending to the lower surface (one example of "first surface region") of the first projecting portion 47A which forms the depth portion of the recessed portion 78. The communication hole 46 also extends into the inside of a cavity defined by the recessed portion 78.

The lead-acid battery 10 of this embodiment has the above-mentioned configuration. Subsequently, the manner of operation and advantageous effects of the lead-acid battery 10 are described.

Usually, a gas generated in the cell chamber 22 of the container 20 is discharged to the exhaust passage 48 through the exhaust sleeve 42 and, thereafter, is discharged to the external space S from the exhaust duct 87 through the common passage 49 and the collective exhaust portion 50.

For example, in the case where an upper end position of a communication hole is set at a height position of a lower surface of a plateau portion of a lid plate, when a solution level of an electrolyte solution which rises due to overcharging rises to a position in the vicinity of a middle lid, an opening region of the communication hole is made small. Accordingly, there is a possibility that the communication hole whose opening region is made small is closed due to a solution film formed by a surface tension of the electrolyte solution. When the communication hole is closed, the gas release passage is no more formed outside the exhaust sleeve and hence, a pressure difference is generated between the inside and the outside of the exhaust sleeve whereby there is a concern of a leakage of an electrolyte solution from the exhaust sleeve.

However, in the lead-acid battery 10 of this embodiment, the recessed portion 78 which is recessed more upward than the lower surface 67B of the plateau portion 67 is formed outside the lower wall portion 52 in the exhaust sleeve 42. Further, the communication hole 46 is formed such that the communication hole 46 reaches the inside of the recessed portion 78 so as to allow the communication hole 46 to communicate with the inside of the recessed portion 78 and the inside of the exhaust sleeve 42 with each other in the lateral direction.

That is, in this embodiment, the communication hole 46 allows the inside of the recessed portion 78 and the inside of the exhaust sleeve 42 to communicate with each other at a position higher than the lower surface 67B of the plateau portion 67 of the lid plate 61. Accordingly, for example, as shown in FIG. 10, even when a solution level of a electrolyte solution W rises to a height position UL in the vicinity of the lower surface 67B of the plateau portion 67, it is possible to suppress a phenomenon that the opening region of the communication hole 46 is made small to an extent that the communication hole 46 is closed by a solution film of the electrolyte solution W whereby a gas is allowed to flow between the inside and the outside of the exhaust sleeve 42 through the communication hole 46. With such a configuration, it is possible to suppress a phenomenon that a solution level in the exhaust sleeve 42 rises due to the generation of a pressure difference between the inside and the outside of the exhaust sleeve 42. Hence, it is possible to suppress a leakage of an electrolyte solution W from the exhaust sleeve 42.

Further, according to this embodiment, the recessed portion 78 is formed at a position which differs from a position where the return flow passage 76 is formed when the plateau portion 67 is viewed in the vertical direction, and the wall portion which forms the recessed portion 78 does not project toward the inside of the return flow passage 76. Accordingly, for example, it is possible to prevent the occurrence of a phenomenon where the recessed portion is formed at the position below the return flow passage and the wall portion which forms the recessed portion projects toward a return flow passage side so that the flow of a solution droplet in the return flow passage is disrupted.

In this embodiment, the communication hole 46 is formed at a position higher than the lower surface 67B of the plateau portion 67. Accordingly, the communication hole 46 is disposed close to the exhaust hole 45 of the exhaust sleeve 42 and hence, there is a concern of a leakage of the electrolyte solution W from the exhaust sleeve 42.

In general, when water or the like enters a narrow space from a wide space, water which enters the inside of the narrow space impinges and reflects on an inner wall which forms the narrow space and is concentrated on an outlet of the narrow space. Accordingly, for example, when vibrations are transmitted to the lead-acid battery 10 in a state where a solution level of the electrolyte solution W rises to a position in the vicinity of the lower surface 67B of the plateau portion 67, and the electrolyte solution flows into the inside of the recessed portion 78 which is a narrow space from the container 20 which is a wide space, the electrolyte solution W which enters the inside of the recessed portion 78 impinges and reflects on an inner wall of the recessed portion 78 and hence, the electrolyte solution W is concentrated on the communication hole 46. Then, a pressure of the electrolyte solution W and a gas which enters the inside of the exhaust sleeve 42 through the communication hole 46 is increased. Accordingly, there is a concern that the electrolyte solution W which enters the inside of the exhaust sleeve 42 and the electrolyte solution W accompanying with a gas which enters the inside of the exhaust sleeve through the communication hole 46 directly splash upward through the communication hole 46 or the electrolyte solution W splashes upward after impinging on the oppsedly-facing wall portion 42B of the exhaust sleeve 42 thus causing a leakage of the electrolyte solution W.

However, according to this embodiment, the first projecting portion 47A is disposed directly above the communication hole 46 in the exhaust sleeve 42 such that the first projecting portion 47A projects more toward the inside of the exhaust sleeve 42 than the communication hole 46, and the second projecting portion 47B is formed on the oppsedly-facing wall portion 42B at a position higher than the first projecting portion 47A in the exhaust sleeve 42.

That is, when a pressure of the electrolyte solution W and a gas which enter the inside of the exhaust sleeve 42 through the communication hole 46 is increased so that the electrolyte solution W which vigorously enters the inside of the exhaust sleeve 42 directly splashes upward, the splashing of the electrolyte solution W is suppressed by the first projecting portion 47A. When the electrolyte solution W vigorously impinges on the oppsedly-facing wall portion 42B from the communication hole 46 so that a splash of the electrolyte solution W splashes upward by way of the oppsedly-facing wall portion 42B, the splashing of the electrolyte solution W can be suppressed by the second projecting portion 47B. With such a configuration, it is possible to suppress a phenomenon that the electrolyte solution W which vigorously enters the inside of the exhaust sleeve 42 from the communication hole 46 leaks to the exhaust passage 48 from the exhaust sleeve 42 through the exhaust hole 45.

Other Embodiments

The technique disclosed in the present specification is not limited to the embodiment described with reference to the above-mentioned description and the drawings, and also includes the following various modes, for example.

(1) In the above-mentioned embodiment, the exhaust sleeve 42 has two projecting portions 47, that is, the first projecting portion 47A and the second projecting portion 47B. However, the technique disclosed in the present specification is not limited to such a configuration, and the exhaust sleeve 42 may have one projecting portion, or may have three or more projecting portions. Further, the exhaust sleeve 42 may be configured such that the exhaust sleeve 42 has no projecting portion by taking any desired means such as increasing a length of the exhaust sleeve 42.

(2) In the above-mentioned embodiment, the lower wall portion 52 having the communication hole 46 is disposed more on the proximal part than on the projecting end of the first projecting portion 47A. However, the technique disclosed in the present specification is not limited to such a configuration, and the lower wall portion may be disposed on the projecting end of the first projecting portion by additionally providing a projecting portion at a position above the first projecting portion.

(3) In the above-mentioned embodiment, the communication hole 46 is formed in the lower wall portion 52 such that the communication hole 46 extends from the upper end to the lower end of the lower wall portion 52. However, the technique disclosed in the present specification is not limited to such a configuration, and the communication hole may be formed only in an upper end portion of the lower wall portion.

(4) In the above-mentioned embodiment, the exhaust sleeve 42 is formed into an angular cylindrical shape. However, the technique disclosed in the present specification is not limited to such a configuration, and the exhaust sleeve 42 may be formed into a circular cylindrical shape.

What is claimed is:

1. A lead-acid battery comprising:
a container storing a plurality of electrodes and an electrolyte solution; and
a lid member fixed to an upper portion of the container, wherein
the lid member includes:
a lid plate configured to seal an opening of the container;
a cylindrical exhaust sleeve formed in the lid plate in a penetrating manner and configured to discharge a gas generated in the container therethrough; and
a recessed portion disposed adjacently to the exhaust sleeve and formed on an inner surface of the lid plate in an outwardly recessed manner, and
the exhaust sleeve has a communication hole which communicates with the inside of the recessed portion and the inside of the exhaust sleeve.

2. The lead-acid battery according to claim 1, wherein the exhaust sleeve has a projecting portion which projects toward the inside of the exhaust sleeve.

3. The lead-acid battery according to claim 2, wherein a wall portion of the exhaust sleeve having the communication hole extends downward toward the inside of the container from a lower surface of the projecting portion.

4. The lead-acid battery according to claim 3, wherein the wall portion having the communication hole is disposed more on a proximal part than on a projecting end of the projecting portion.

5. The lead-acid battery according to claim 1, wherein on an opposedly-facing wall portion of the exhaust sleeve which opposedly faces the wall portion having the communication hole, the projecting portion is formed at a position above the communication hole.

6. The lead-acid battery according to claim 1, wherein a return flow passage which allows a solution droplet to return to the inside of the container is formed on an upper surface of the lid plate, and
the recessed portion is formed at a position which is other than a position where the return flow passage is formed as viewed in an axial direction of the exhaust sleeve.

7. The lead-acid battery according to claim 1, wherein an inner surface of the lid plate has a first surface region and a second surface region disposed adjacently to the first surface region at a position disposed adjacently to the exhaust sleeve, and the first surface region is recessed outward with respect to the second surface region thus forming the recessed portion.

8. The lead-acid battery according to claim 7, wherein the communication hole formed in the exhaust sleeve is a slit extending to the first surface region.

9. The lead-acid battery according to claim 1, wherein the communication hole formed in the exhaust sleeve extends into a cavity defined by the recessed portion.

* * * * *